Figure 1:
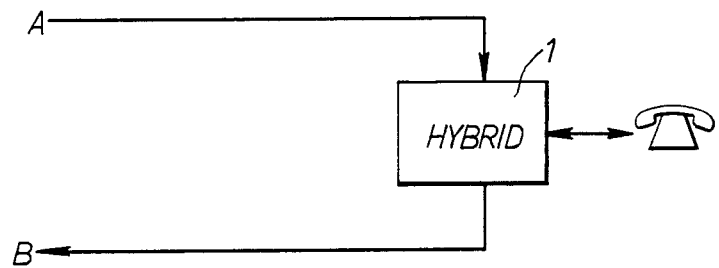

United States Patent [19]

Beniston et al.

[11] Patent Number: 4,757,527
[45] Date of Patent: Jul. 12, 1988

[54] ECHO CANCELLER

[75] Inventors: Graham Beniston, Bucks; Nigel P. Dyer, London; Andrew J. T. Wheen, Maidenhead, all of England

[73] Assignee: Plessey Overseas Limited, Ilford, England

[21] Appl. No.: 772,571

[22] Filed: Sep. 4, 1985

[30] Foreign Application Priority Data

Sep. 12, 1984 [GB] United Kingdom ............... 8423017

[51] Int. Cl.[4] ............................................. H04B 3/23
[52] U.S. Cl. .................................... 379/410; 370/32.1
[58] Field of Search ............... 179/170.2, 170.6, 170.8; 364/724; 333/18; 379/406, 399, 410, 411; 370/32, 32.1

[56] References Cited

U.S. PATENT DOCUMENTS 4,347,615  8/1982  Ash ........................................ 375/14

FOREIGN PATENT DOCUMENTS 0092927  6/1982  Japan .
1380994  1/1975  United Kingdom .
1389945  1/1975  United Kingdom .

Primary Examiner—Jin F. Ng
Assistant Examiner—Randall S. Vaas
Attorney, Agent, or Firm—Michael F. Oglo; Julian C. Renfro

[57] ABSTRACT

A digital adaptive echo canceller for use in cancelling echo signals caused by trans-hybrid losses in two-wire to four-wire converters comprises first and second adaptive filters (20,22) each arranged to generate synthetic echo signals. Transfer control logic (23) compares difference signals relative to the difference between the synthetic echo signal generated by the first filter (22), and a real echo signal and the synthetic echo signal generated by the second filter (20) and the real echo signal, and if the synthetic echo signal from the first filter (22) is closer to the real echo signal causes transfer of the coefficients of the first filter (22) to the second filter (20) such that the synthetic signal mixed with transmitted speech signals in a mixer (24) is updated when necessary.

1 Claim, 5 Drawing Sheets

ECHO CANCELLER

This invention relates to echo cancellers and more particularly to adaptive echo cancellers for use in telephone systems.

In telephone systems there is usually provided a Subscriber Line Interface Circuit (SLIC) provides an interface between a two wire telephone line which connects a subscriber to the local exchange and the transmission and control signals employed within the exchange. One of the functions of this circuit is to convert analog speech signals in the two wire line that pass to and from the local subscriber into four wire analog or digital signals for transmission within the exchange. This function is termed 'Two to Four wire conversion'.

An important function of the two to four wire converter is to prevent echoes i.e. prevent speech signals received from the distant subscriber from being retransmitted back to the distant subscriber. It is not possible to perform this function perfectly, and the degree to which such signals are attenuated is called the 'Trans-Hybrid-loss' (THL). If the THL is low then the speech quality is impaired, this effect increasing in importance as the delay incurred by speech signals as they pass through the transmission network increases. there are two prior art methods which can be used to perform the 'two to four wire conversion'. The first, and conventional method, uses transformer coupling techniques together with a number of passive components. There is contained within such a circuit a 'balance network', Zb which will approximate to the input impedance of the local line. The THL achieved by such a circuit is related to the closeness by which Zb matches the local line input impedance.

The drawback of this technique is that a single network can not provide a satisfactory match to the full range of local line impedance that will be found in a local network. The circuit designer is left with the choice of poor system performance or matching Zb to the input impedance of the local line on a per line basis which is expensive.

More recent prior art involves performing the two to four wire conversion using integrated circuits, and these circuits will make little attempt at achieving a satisfactory THL. The four wire analog signals from the two to four wire converter will then be converted to digital signals. Digital Signal Processing (DSP) techniques then allow the use of programmable digital filters to improve the THL of the complete SLIC.

The four wire output of the two to four wire converter will produce the unwanted echo of the speech signal received from the far end subscriber. In order that this signal be reduced, a programmable digital filter is used to produce a synthetic echo signal which is a close approximation of the real echo. Subtracting these two signals will reduce the amplitude of the unwanted echo, and the remaining signal after this subtraction is termed the 'error signal'.

It is possible to calculate sets of co-efficients for such a programmable digital filter such that a given set will result in an overall performance similar to that achieved with a transformer coupled circuit described earlier with a particular impedance Zb used in the circuit. This method has the advantage that Zb selection can be performed under software control rather than by physically changing components within the SLIC. The disadvantage of this method is that it continues to rely on manual setting up of the local line parameters on a per line basis.

A further disadvantages of both methods is that there is a wide variety of input impedances exhibited by subscribers apparatus, and the possibility of switching from one apparatus to another during a call means it is impossible to maintain good THL throughout the call.

These problems have prompted a number of papers on adaptive methods of achieving good THL, based on the large body of knowledge about echo cancellers developed for use on long distant and satalite calls.

Research to date has produced a number of algorithms that can be used to perform the filter co-efficient adaption. Examples include the Least Mean Squares, (LMS) and the Recursive Least Squares (RLS) algorithms. In all cases the filter co-efficients are adjusted to minimise the amplitude of the unwanted ech signal.

All adaptive methods rely on information contained within the speech signal received from the distant subscriber. Adaption algorithms suffer to varying degrees if there is an abience of speech signal from the distant subscriber, especially if the near end subscriber is talking. They will also suffer if both near end and far end subscribers are talking a condition known as doubletalk. In these conditions, the filter co-efficients will tend to diverge from their ideal performance, giving a degradation in performance. The prior art approach to this problem is to detect the conditions in which the adaption algorithm no longer functions correctly and freeze the co-efficients during these conditions.

The detection of unsuitable convergence conditions has proved to be difficult. Some highly complex and, therefore difficult to implement ideas have been suggested. In addition these techniques can still result in some conditions arising where the adaptive filter is permanantly frozen, and incapable of adapting to improve the THL.

It is an object of the present invention to provide an adaptive method of generating a synthetic echo signal for improving the THL performance on a two to four wire converter.

According to the present invention there is provided a digital adaptive echo canceller comprising a first adaptive filter for generating a synthetic echo signal, means for causing the co-efficients of said first filter to more closely match the real echo signal to be cancelled, a second programmable filter for generating a synthetic echo signal, and a transfer control logic for determining whether the first filter is performing better than the second filter and if so for causing the co-efficients of the second filter to be updated from the co-efficients of the first filter.

Further the present invention provides means for generating a first error signal indicative of the difference between the synthetic echo from said first filter and the real echo, and means for generating a second error signal indicative of the difference between the synthetic echo from said second filter and the real echo, the second error signal or speech signal is for transmission to the far end subscriber.

Preferably the transfer control logic circuit comprises scaling the second filter error signal, means for ensuring that both the first and second error signals are positive, means for determining the difference between the scaled second filter error and the first filter error signal and means responsive to said difference which when a preselected condition is reached causes the transfer of co-efficients of the first filter to the second filter, whereby the co-efficients of the second filter are updated.

Preferably said first filter error signal has all DC components removed by an adaptive DC tap before the first error signal is used again and means by which said adaptive DC tap may adapt to minimise the DC component in the error signal. The output from the DC tap is used to remove the DC component from said second filter error signal before it is used in the transfer control logic and advantageously from said second filter error signal before being used at any other place.

Advantageously, the filter needs no initial adjustment and will respond correctly to any changes in the impulse response of the echo path.

Embodiments of the present invention will be more clearly understood from the following description as an example only, with reference to the accompanying drawings wherein:

FIG. 1 shows a conventional interface between a two wire telephone line that connects the subscriber to a local exchange and a four wire trunk line used between exchanges.

Figure 2:
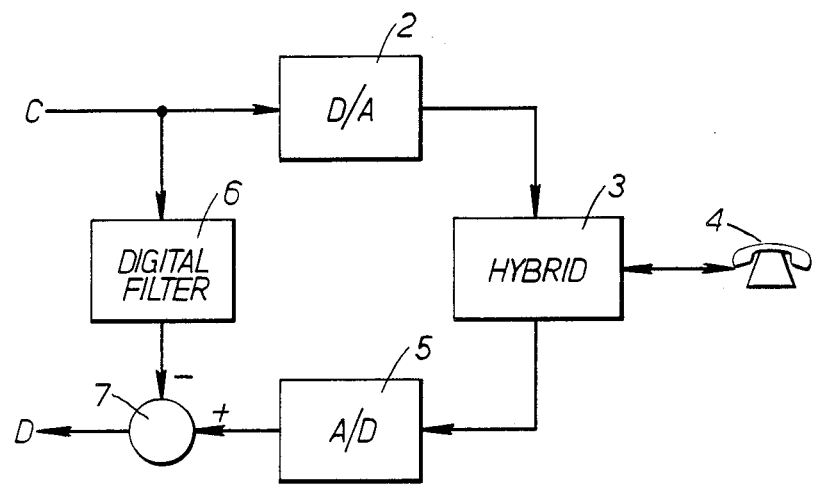
Figure 3:
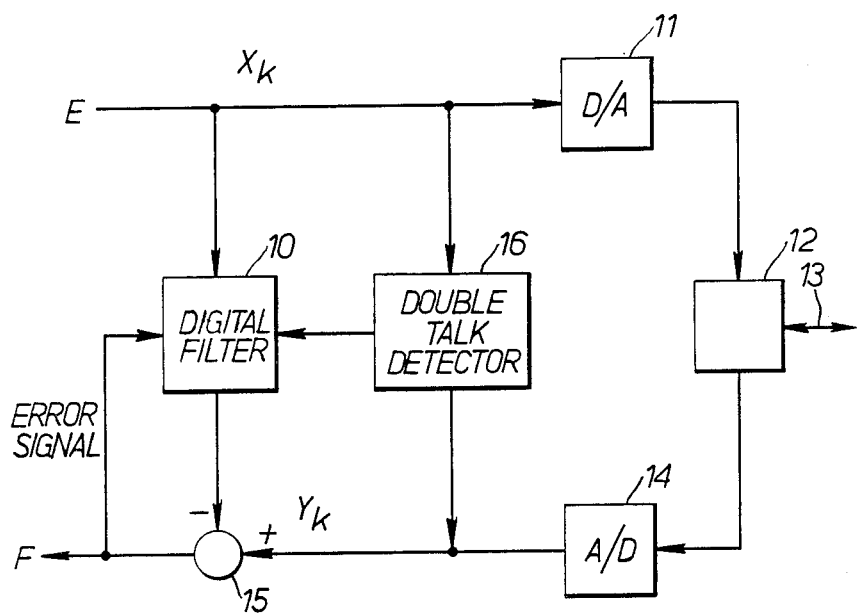
Figure 4:
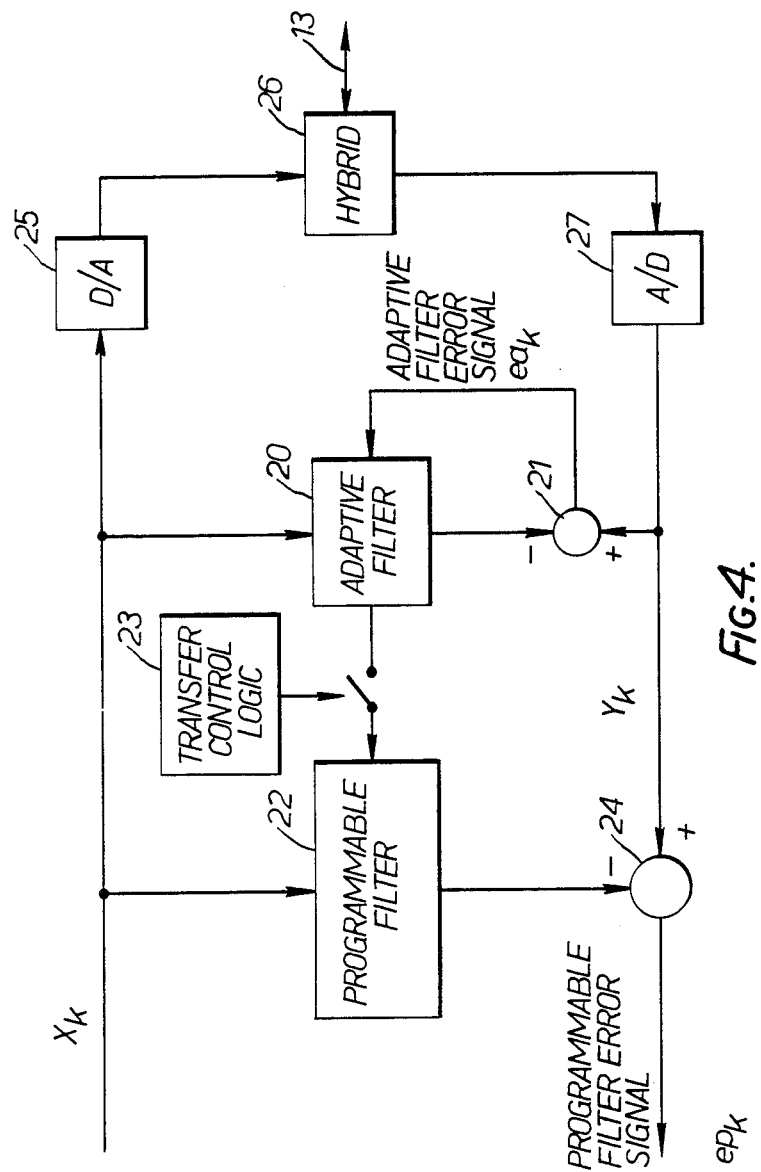
Figure 5:
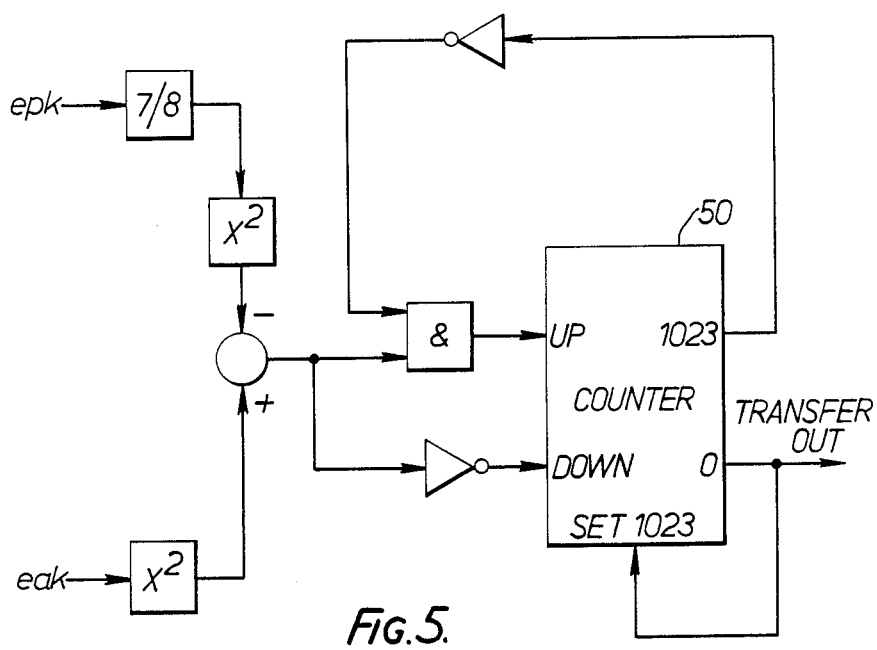
Figure 6:
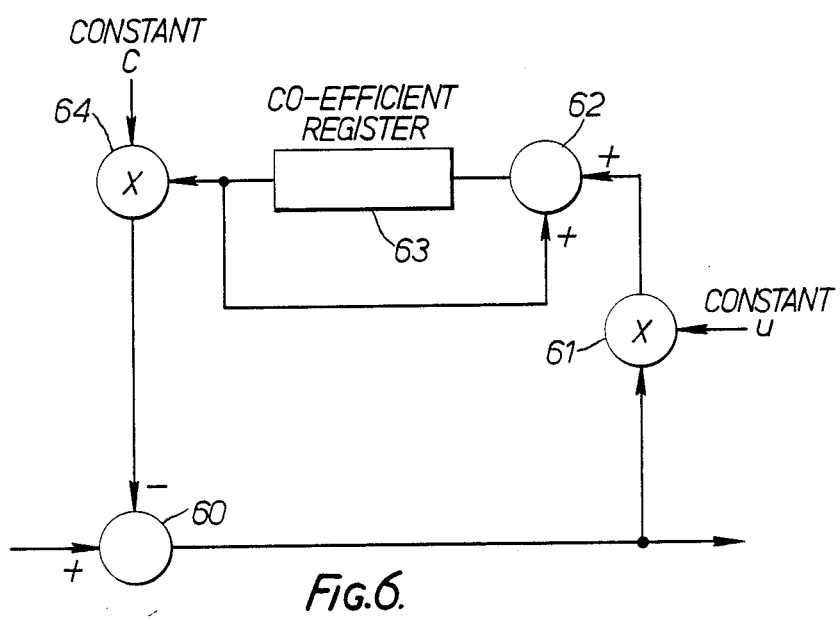
Figure 7:
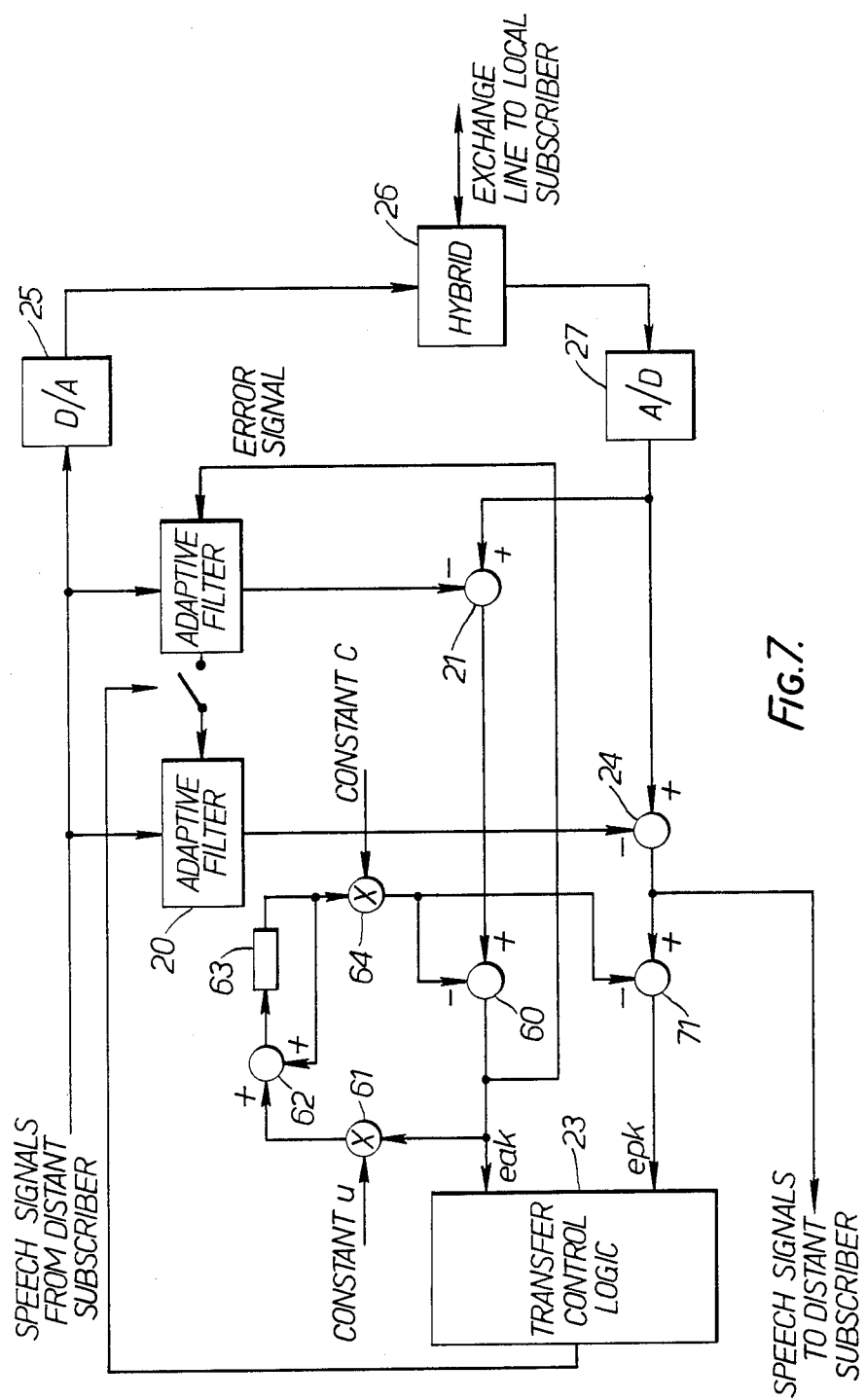

FIG. 2 shows the basic technique of digital echo cancellation using a fixed filter, FIG. 3 shows a prior art arrangement of conventional digital adaptive echo canceller, FIG. 4 shows an echo canceller with two digital filters, FIG. 5 shows a transfer control logic according to the present invention, FIG. 6 shows an adaptive DC tap for removal of any DC component within the signal according to the present invention, FIG. 7 shows an Adaptive Echo canceller incorporating Adaptive removal of DC according to the present invention.

Referring to FIG. 1, any speech at point A that re-emerges at point B is termed an echo and the degree to which this signal has been attenuated by its passage through the Hybrid Interface 1 is termed the Trans-Hybrid Loss (THL). Speech at point A will normally have been received from the far end subscriber and is called 'Receive speech'. Speech at point B will normally be transmitted to the far end subscriber and is called transmit speech.

The basic technique for echo cancellation is shown in FIG. 2, where the digital speech signals arriving at point C are converted to analog by the Digital to Analog (D/A) converter 2 before they reach the hybrid interface 3, whilst echoes and/or speech from the subscriber telephone Y are converted to digital signals through the Analog to Digital converter 5.

At the same time, a Finite Impulse Response (FIR) digital filter 6, with an impulse response similar to that of the echo path, is used to generate a synthetic echo which is subtracted using a subtractor 7 from the otput of A/D converter 5, thereby eliminating the real echo from the signal, but leaving the subscriber's speech signal completely unaffected.

A system such as shown in FIG. 2 would have its co-efficients programmed at the start of a call and would remain fixed during the call. They would have been pre-calculated to give good performance on a typical line, and would therefore not give such good performance when used with subscriber lines other than such typical lines.

FIG. 3 shows the structure of a conventional digital adaptive echo canceller. As in the arrangement shown in FIG. 2, an FIR digital filter 10 is used to generate the synthetic echo signal; this signal is then subtracted from the output of the A/D converter 14, thereby eliminating the real echo. The adaptive FIR filter 10 is normally based upon an adaptive algorithm of either the Least Mean Squares (LMS) or the Recursive Least Squares (RLS) types, and the co-efficients of this filter are adjusted in an attempt to minimise the output from the subtraction operation.

Advantageously adaptive digital filters are used to compensate for different impulse responses associated with untypical subscribers telephones and to compensate for variations in the impulse response caused by changes in the subscribers telephone system.

Although adaptive digital filtering has not previously been employed for echo cancellation at the subscriber's 2 wire/4 wire interface, the technique is widely used on international connections, and a body of theory has been built up as a result.

A number of methods of implementing the adaptive FIR filter have been developed using this body of theory, and the invention is equally as applicable to any of these adaptive FIR filters and as such the invention does not constrain the type of adaptive filter providing it conforms to the broad requirements outlined earlier in the description of FIG. 3. The description of the invention will therefore not describe the operation of the Adaptive Filter in further detail. The actual implementation is based on the Least Mean Squares (LMS) algorithm.

If speech is received at point E during a period when the subscriber is silent, echoes are generated at the hybrid 12, and the adaptive filter 10 will adjust its co-efficients to ensure that the output from the subtractor 15 is zero. If, on the other hand, no speech is arriving at point E, then both the real and the synthetic echoes will be zero, and the coefficients in the adaptive filter 10 will be unaffected. A problem is encountered, however, if the two speakers talk simultaneously—situation referred to as "doubletalk".

When doubletalk occurs, the output of the A/D converter 14 consists of an echo signal with speech from the local subscriber superimposed upon it. After the synthetic echo has been subtracted, only the speech signal remains, and this is transmitted to the far end of the line. However, the adaptive filter now sees a non-zero output from the subtractor, and assumes that the impulse response around the echo path must have changed. It therefore changes its co-efficients in a attempt to correct for this but, in doing so, it actually diverges from the required impulse response.

In order to prevent this divergence, a doubletalk detector 16 is normally used to inhibit coefficient updating during periods of doubletalk, as shown in FIG. 3. The doubletalk detection algorithm compares the current output of the A/D converter 14 ($Y_k$) with the N most recent samples to arrive at point E ($x_{k-1}$ ... $x_{k-N}$) and declares doubletalk whenever $Y_k > \frac{1}{2} \cdot \text{MAX}$ ($x_{k-1}, x_{k-2} \ldots x_{k-N}$)

The need to examine N previous samples of x arises because of possible delays in the echo path, and the factor of $\frac{1}{2}$ is based upon the assumption of at least 6 dB trans-hybrid loss. Whenever doubletalk is detected using this method, the adaptive co-efficients are frozen for a fixed hangover time.

There are a number of problems with this approach. One problem is its reliance on 6 dB loss through the hybrid 12. When the hybrid has to work to a wide range of exchange line plus customer apparatus input impedances then it is not always possible to guarantee 6 dB loss. A second problem is that under certain adverse conditions of high near end noise and low signal levels being received from the distant subscriber E, the adaption circuit may never be enabled, and the system echo performance will be very poor.

Referring now to FIG. 4 which shows the basic structure of a design for an international echo canceller that makes use of two separate filters to model the echo path.

The operation of the adaptive filter 20 in FIG. 4 is essentially the same as that shown in FIG. 3, with the exceptions that coefficient updating is not inhibited during periods of doubletalk, and the output of the subtractor 21 is not transmitted to the far end of the line. Echo cancellation is performed by a programmable filter 22, the co-efficients of which are updated from the co-efficients of the adaptive filter 20 when a Transfer Control Logic 23 decides that the adaptive filter 20 is performing significantly better than the programmable filter 22.

Although FIG. 4 does not show a doubletalk detector, this should not be taken to mean that the doubletalk problem has been solved; the problem has simply been transferred from the design of the doubletalk detector to the design of the Transfer Control Logic 23. During periods of doubletalk, the adaptive filter 20 diverges appreciably, and advantageously no co-efficient transfers are allowed to take place when this happens.

A similar, previously described echo canceller for use to control echoes on international calls or international calls required that three separate and relatively complex criteria should be fulfilled before a co-efficient transfer can be allowed to take place. Such elaborate rules mean a costly and difficult to implement Transfer Control Logic.

A block diagram of a less complicated Transfer Control Logic of the present invention is shown in FIG. 5. A fixed filter error signal, $ef_k$, is scaled by 0.875, squared and subtracted from the square of the adaptive filter error signal, $ea_k$. A positive result from this subtraction operation causes a counter 50 to be incremented by one, whereas a negative result causes the counter to be decremented by one.

The counter 50 has a ten bit output, and is initially set to its maximum value (1023). Hardware is provided to ensure that the counter 50 cannot fold around from 1023. to 0; that is to say, the output saturates at 1023. If the counter output reaches zero, then a transfer of co-efficients from the adaptive to the fixed filter takes place, and the counter 50 output is reset to 1023.

There are a number of ways in which this design could be modified without affecting the basic algorithm. Firstly, the subtraction operation could be performed the other way around, and a transfer of co-efficients would then be triggered whenever the counter 50 reached its maximum output. Secondly, the squaring operations could be replaced by hardward to find the absolute value of each error, because the squaring is used simply to ensure that both errors are positive. Thirdly, the scaling of the fixed filter error by $\frac{7}{8}$ could be performed after the error has been converted to positive, although the factor would have to become $\frac{3}{4}$ if the conversion to positive is performed by squaring. Finally, it would be possible to make small changes to the $\frac{7}{8}$ scaling factor and to the counter output range wihtout significantly affecting the performance of the algorithms.

Another possible change to the arrangement shown in FIG. 5 would be to replace the up/down counter 50 by a loss pass filter. The output of the filter would saturate if it reached a certain pre-defined limit, and would trigger a transfer of co-efficients if it reached the opposite limit; as in the case of the up/down counter 50, the filter's output would be reset to its saturation level if a transfer of co-efficients took place.

The above mentioned change would not affect the operation of the algorithm, because the up/down counter is behaving as a digital integrator; and the integrator is a low pass filter. The purpose of the up/down counter 50 is to eliminate short-term variations in the error difference signal, whilst following the underlying trend.

The present invention is based upon the arrangements shown in FIG. 4 incorporating the Transfer Control Logic arrangement shown in FIG. 5.

Referring to FIG. 4, any DC offset that is superimposed on the output signal from the A/D converter 27 will also be superimposed on the Adaptive Filter Error Signal $ea_k$ at the output of the subtractor 21. Prior Art adaptive filters will see this signal as an error signal and will attempt to adapt its co-efficients to remove this DC offset. It may succeed in a limited fashion, but its attempts are ill conceived because DC offsets on the signal will have no effect on the subjective performance off the speech channel and attempts at removing the DC offset will be at the expense of its ability to cancel the real echo signal of the receive speech $x_k$ which appears at the output of the Hybrid 26. This effect is especially marked when speech signal levels are small compared to the amplitude of the DC offset and will result in unacceptably poor echo cancellation.

FIG. 6 shows the form of an adaptive DC tap which forms part of the present invention. The DC tap operates in a similar manner to one stage of an adaptive FIR filter using the LMS algorithm, eccept that it uses constant C rather than a delayed version of the Receive speech. The DC tap can advantageously be incorporated within the implementation of the adaptive FIR filter 20 if it uses the LMS algorithm. The DC tap co-efficient can then be updated in the same way as the other co-efficients.

Referring to FIG. 6, the subtractor 60 removes the current estimate of the DC component of the signal G, which appears at the output of the multiplier 64 from the input signal G, which appears at the output of the multiplier 64 from the input signal G to produce the output signal H. The signal H is scaled by a factor u using multiplier 61 and used to update the co-efficient held in register 63 using the adder 62 to produce an updated value of the co-efficient in register 63. The co-efficient is multiplied by constant C using mulitplier 64 to produce the current estimate of the DC component in the input signal G. The value of constants u and C will depend on the physical characteristics of the channel in which this is being used. It is possible to eliminate one or other of these constants. The co-efficient will normally, but not neccessarily be updated with every input sample received.

FIG. 7 shows the complete example of the present invention including Transfer Control Logic, Adaptive and Programable filters and DC taps. The operation of the D/A converter 25, Hybrid 26 and A/D converter 27 are more fully described in the description of FIG. 2.

The output of the A/D converter is taken to the subtractor 21 where the synthetic echo from the Adaptive FIR filter 20 is removed, as more fully described in the description of FIG. 3. The output signal from the subtractor 21 is taken to the subtractor 60 which forms part of the DC tap circuit compressing the subtractor 60, Multiplier 61, Adder 62, Register 63 and Multiplier 64 whose operation is more fully described in the description of FIG. 6.

The output of the subtractor 60 is used as the error signal which is used to control the adaption of the adaptive filter 22. In addition, the output of subtractor 60 becomes the control signal $ea_k$ for the Transfer Control Logic 23 more fully described in the description of FIG. 5.

The output from the D/A converter 27 is also taken to the input of the subtractor 24 where th synthetic echo signal produced by the programmable FIR filter 20 is removed. The output of the subtractor 24 constitutes the signal which is transmitted to the far end subscriber.

The output from the subtractor 24 is also taken to the input of the subtractor 71 where the DC component of the signal is largely removed by subtracting the output signal from the multiplier 64 which forms part of the DC tap. The output of the subtractor 71 becomes the control signal $ep_k$ for the Transfer Control Logic 23 more fully described in the description of FIG. 5.

We claim:

1. A digital adaptive echo canceller for providing echo cancellation signals in a two-wire to four-wire converter, said echo canceller comprising a first adaptive filter for generating a synthetic echo signal and having a plurality of filter coefficients, means to adjust the coefficients of said first filter in dependence upon differences between the synthetic echo signal and a real echo signal to be cancelled, a second programmable filter for generating a synthetic echo signal for mixing with an output signal of the converter, and transfer control logic arranged to determine whether the synthetic echo signal from the first filter matches the real echo signal more closely than the synthetic echo signal from the second filter, and, if so, to cause the coefficients of the second filter to be updated to match the coefficients of the first filter, said transfer control logic comprising first error signal generating means for generating a first error signal in dependance upon the difference between the synthetic echo signal from said first filter and the real echo signal, and second error signal generating means for generating a second error signal in dependance upon the difference between the synthetic echo signal from said second filter and the real echo signal, said transfer control logic comprises delay means arranged to inhibit updating of the coefficients of the second filter until the synthetic echo signal from the first filter is consistently closer to the real echo signal than the synthetic echo signal from the second filter, said delay means includes an up-down counter arranged to count in one direction when the first error signal is smaller than the second error signal and in an opposed direction when the second error signal is smaller then the first error signal, said transfer control logic being arranged to effect updating of the coefficients of the second filter when a pre-determined value of the count is reached, said transfer control logic further comprising means for scaling the second error signal, means for determining the difference between the scaled second error signal and the first error signal and means responsive to said difference when a preselected condition is reached to cause the transfer of coefficients from the first filter to the second filter.

* * * * *